United States Patent [19]
Dickensheets et al.

[11] Patent Number: 6,007,208
[45] Date of Patent: Dec. 28, 1999

[54] MINIATURE SCANNING CONFOCAL MICROSCOPE

[75] Inventors: David L. Dickensheets; Gordon S. Kino, both of Stanford, Calif.

[73] Assignee: The Board of Trustees of the Leland Stanford Junior University, Palo Alto, Calif.

[21] Appl. No.: 08/998,187

[22] Filed: Dec. 24, 1997

Related U.S. Application Data

[63] Continuation of application No. 08/797,931, Feb. 12, 1997, which is a continuation-in-part of application No. 08/575,687, Dec. 19, 1995, Pat. No. 5,742,419.

[51] Int. Cl.⁶ .......................... G02B 7/182; G02B 26/08
[52] U.S. Cl. .......................... 359/872; 359/873; 359/874; 359/220; 359/221; 359/223; 359/224; 359/225; 359/226; 359/197; 359/198; 359/203; 359/201; 359/202
[58] Field of Search ..................... 359/872, 873, 359/874, 220, 221, 223, 224, 225, 226, 197, 198, 203, 201, 202

[56] References Cited

U.S. PATENT DOCUMENTS

| | | | |
|---|---|---|---|
| 4,956,619 | 9/1990 | Hornbeck | 330/4.3 |
| 5,061,049 | 10/1991 | Hornbeck | 359/224 |
| 5,096,279 | 3/1992 | Hornbeck et al. | 359/221 |
| 5,120,953 | 6/1992 | Harris | 250/227.2 |
| 5,392,151 | 2/1995 | Nelson | 359/223 |
| 5,488,862 | 2/1996 | Neukermans et al. | 73/504.02 |
| 5,557,444 | 9/1996 | Melville et al. | 359/199 |
| 5,629,790 | 5/1997 | Neukermans et al. | 359/198 |
| 5,646,768 | 7/1997 | Kaeriyama | 359/223 |
| 5,648,618 | 7/1997 | Neukermans et al. | 73/862.08 |
| 5,703,728 | 12/1997 | Smith et al. | 359/871 |
| 5,862,003 | 1/1999 | Saif et al. | 359/223 |

OTHER PUBLICATIONS

L.Giniunas, R. Juskaitis & S.V. Shatalin, "Scanning Fibre Optic Microscope," *Elect. Lett.* 27, 724–726 (1991).

T.Dabbs & M.Glass, "Fiber–optic Confocal Microscope: FOCON," *Applied Optics* vol. 31, No. 16, 3030–3035 (1992).

L.Giniunas, R. Juskaitis & S.V. Shatalin, "Endoscope with optical sectioning capability," *Applied Optics* vol.32, No. 16, 2888–2890 (1993).

R. Juskaitis & T. Wilson, "Direct–view fiber–optic confocal microscope," *Opt. Lett.* 19, 1906–1908 (1994).

P.M. Delaney, M.R. Harris & R.G. King, "Fiber–optic laser scanning confocal microscope suitable for fluorescence imaging," *Applied Optics* vol. 33, No. 4, 573–577 (1994).

D. Azis & A.F. Gmitro, "Confocal microscopy via a fiber–optic imaging bundle," *Opt. Fibers in Medicine,* VIII, 53–61 (1993).

(List continued on next page.)

*Primary Examiner*—Cassandra Spyrou
*Assistant Examiner*—Mohammad Y. Sikder
*Attorney, Agent, or Firm*—Flehr Hohbach Test Albritton & Herbert LLP

[57] ABSTRACT

A scanning optical microscope which includes an optical fiber which serves as a point source of light and for collecting reflected light is disclosed. A lens for focusing the light from the optical fiber onto an image plane and for gathering light reflected from the image plane and focusing it into the optical fiber is also disclosed, together with a scanning mechanism for scanning the light to scan a field of view.

23 Claims, 16 Drawing Sheets

OTHER PUBLICATIONS

D. Dickensheets and G.S. Kino, "A Scanned Optical Fiber Confocal Microscope," *Proc. SPIE*, 2134, 39–47 (1994).

K.E. Petersen, "Silicon Torsional Scanning Mirror," *IBM J.Res.Dev.* 24, 631–637 (1980).

M.G. Allen, M. Scheidl & R.L. Smith, "Movable Micromachined Silicon Plates with Integrated Position Sensing," *Sensors and Actuators* A21–A23, 211–214 (1990).

V.P. Jaecklin, C. Linder and N.F. de Rooij, J.M. Moret & R. Vuilleumier, "Line–addressable torsional micromirrors for light modulator arrays," *Sensors and Actuators* A41–A42, 324–329 (1994).

M. Fischer, H. Graef & W. Von Munch, "Electrostatically deflectable polysilicon torsional mirrors," *Sensors and Actuators* A44, 83–89 (1994).

K.E. Mattsson, "Surface micromachined scanning mirrors," *Microelectronic Engineering* 19, 199–204 (1992).

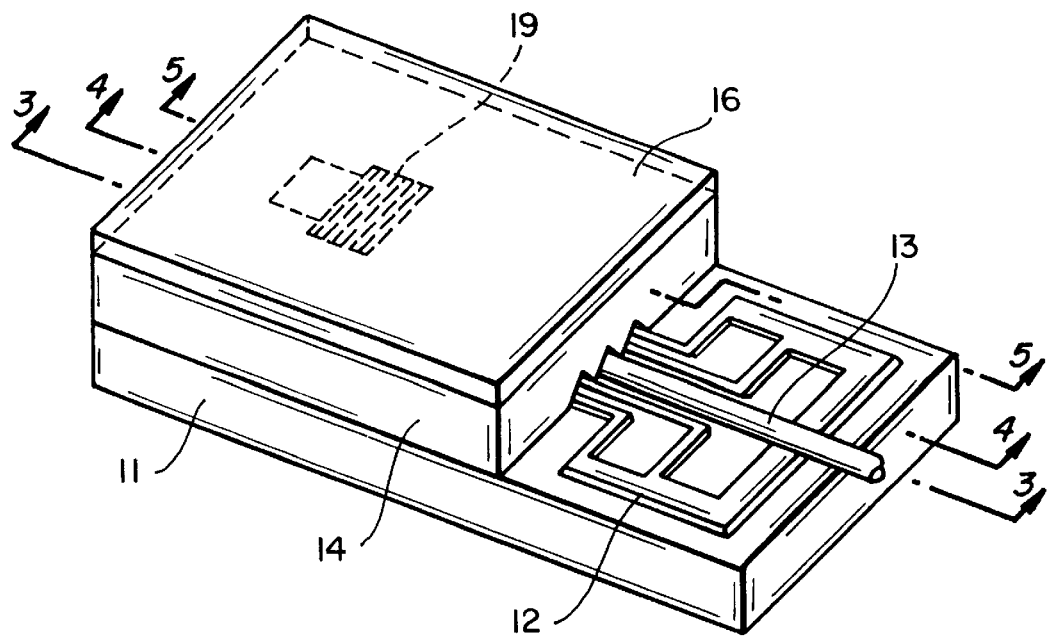
FIG_1
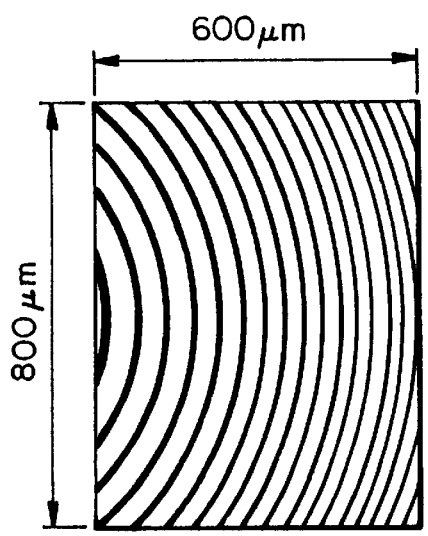
FIG_6
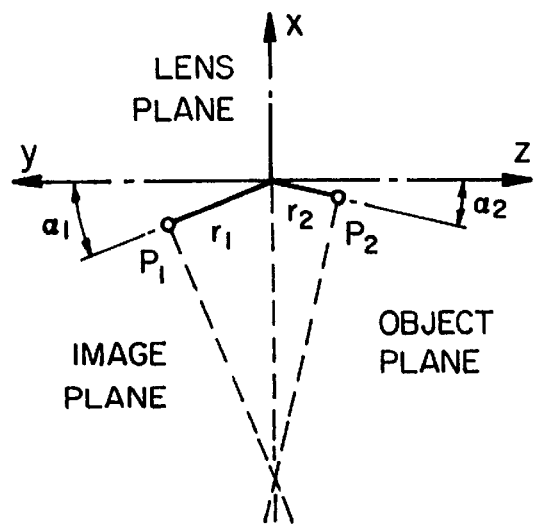
FIG_7

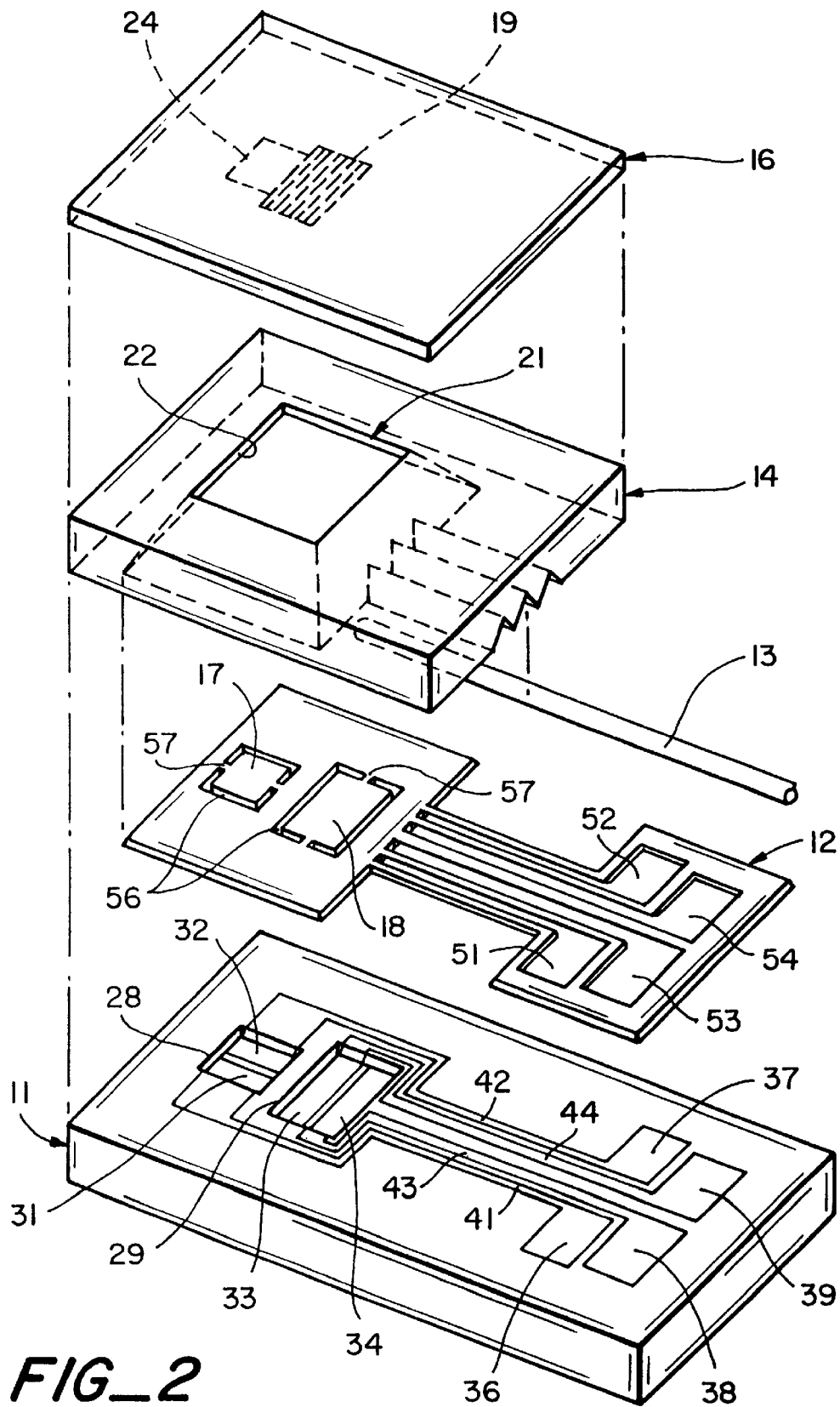
FIG_2

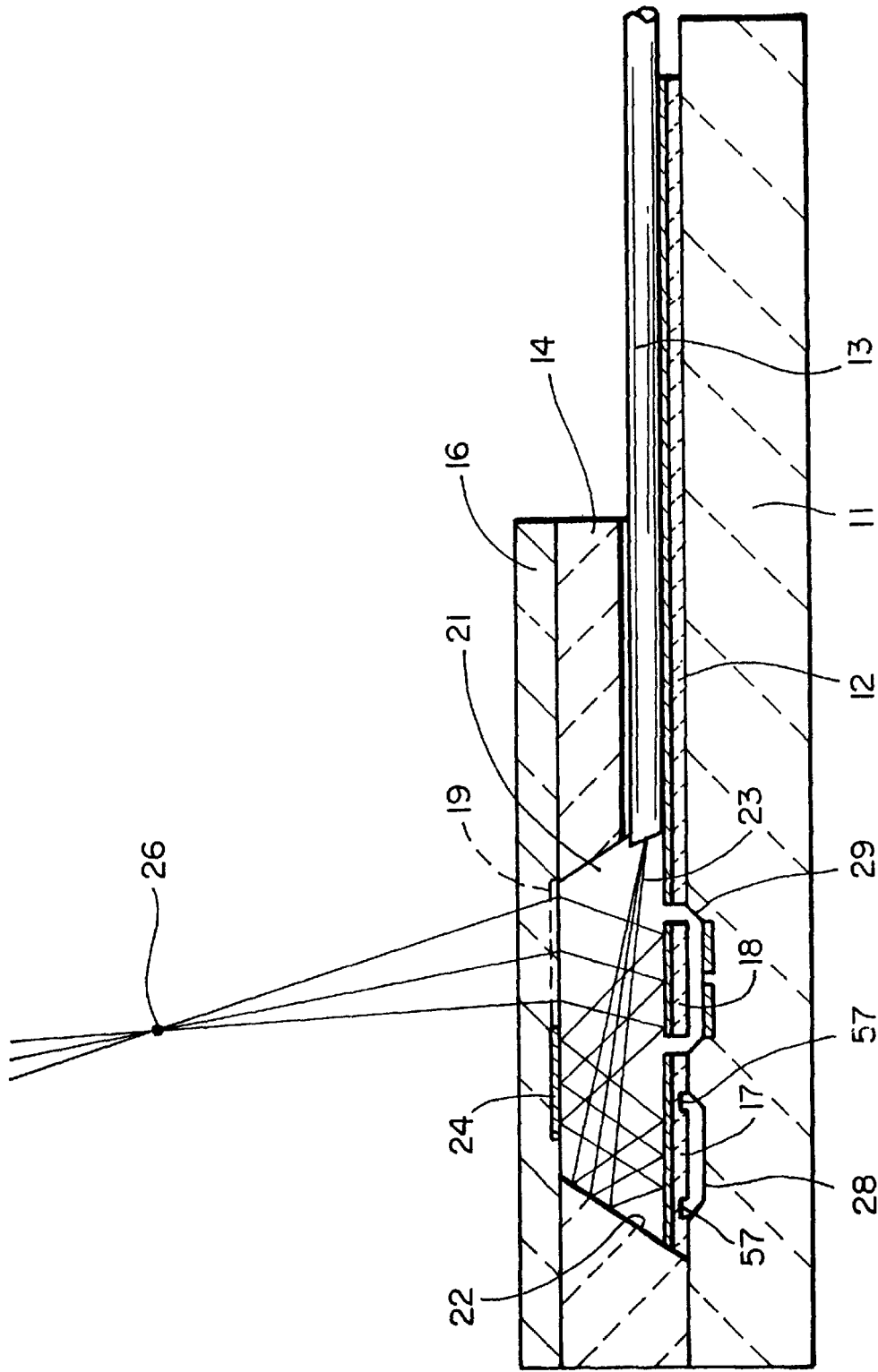
FIG_3

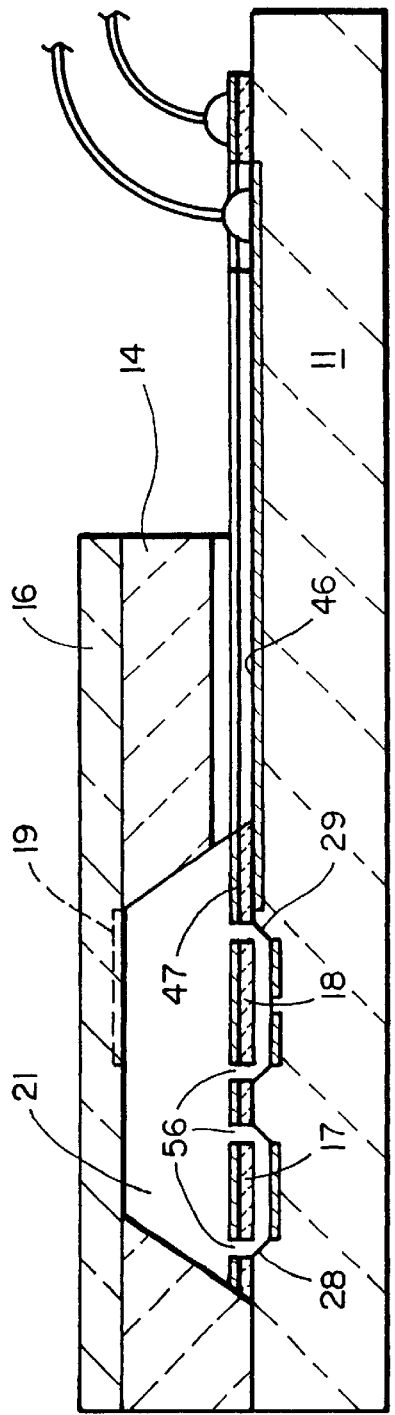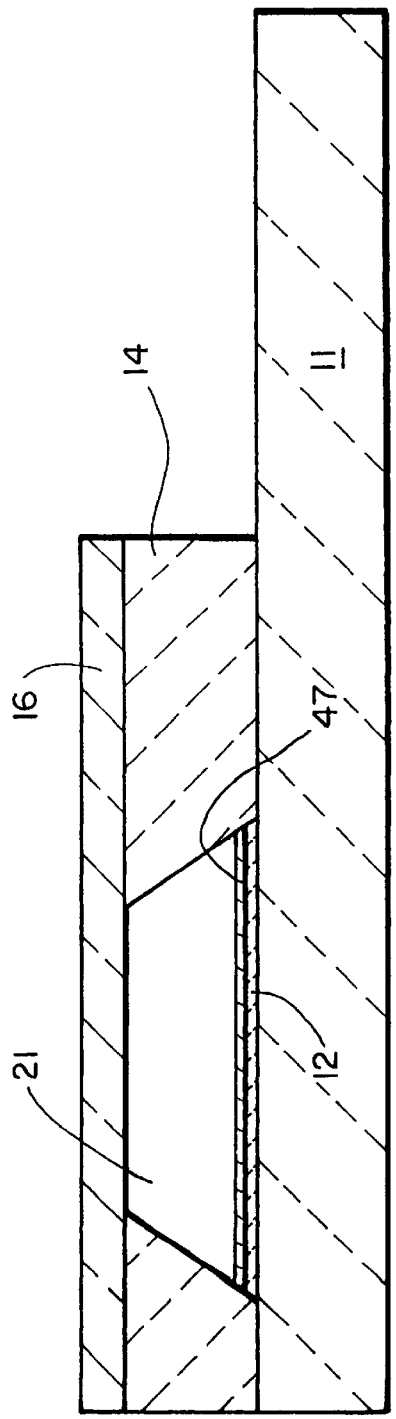

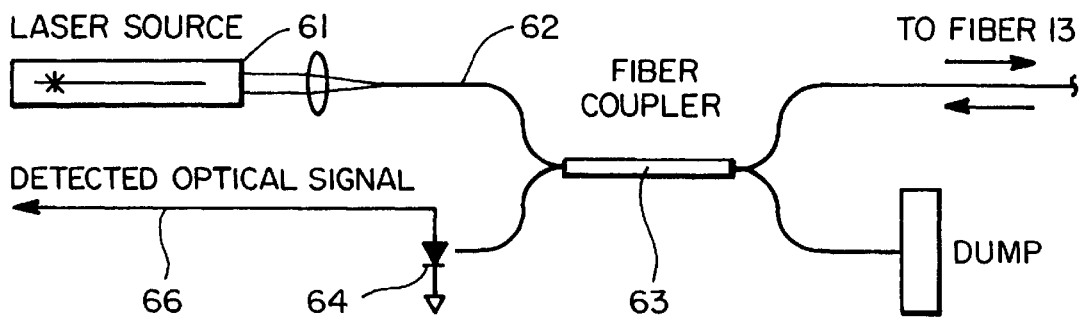
FIG_8
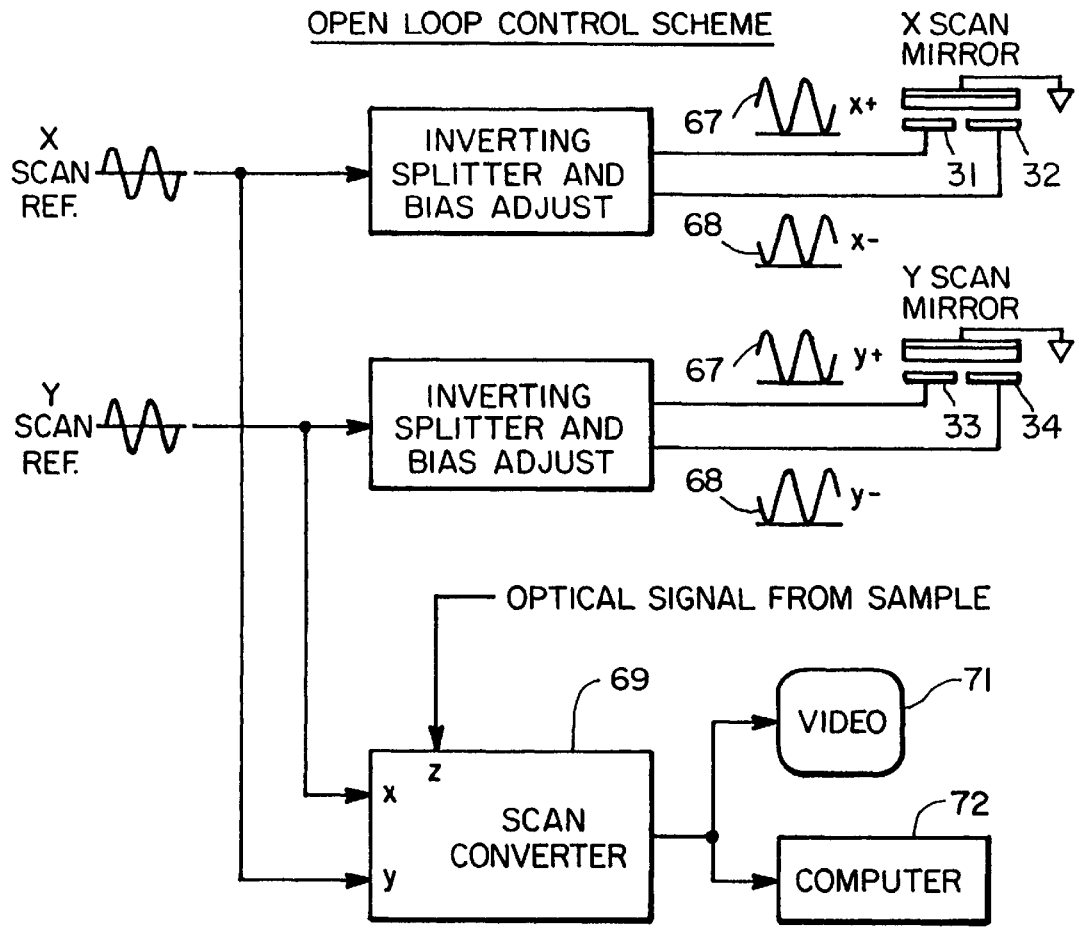
FIG_9

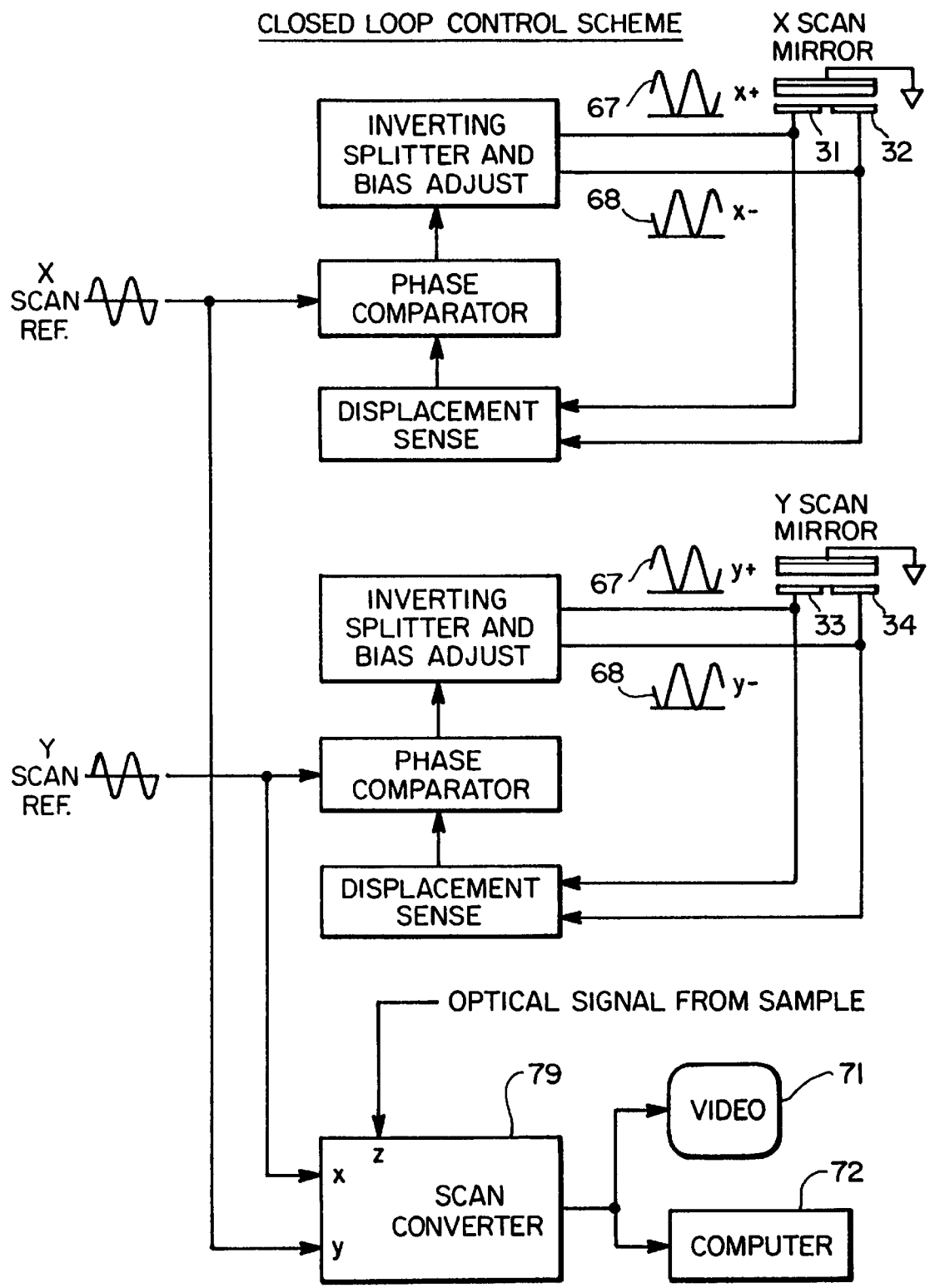
FIG_10

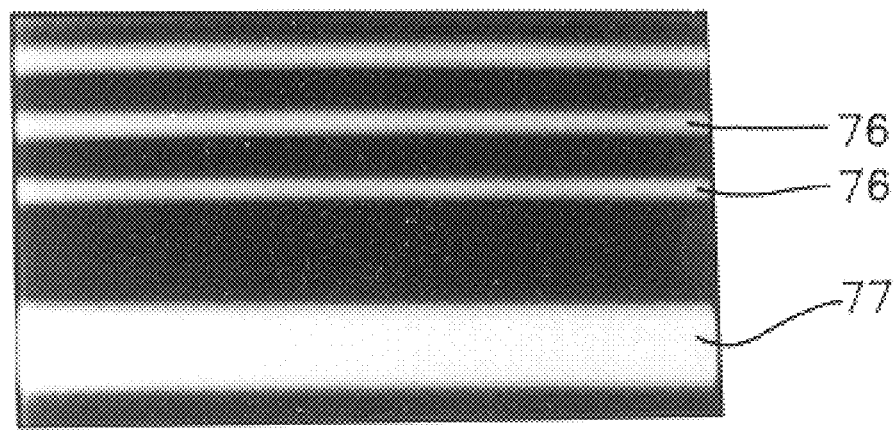
FIG_11
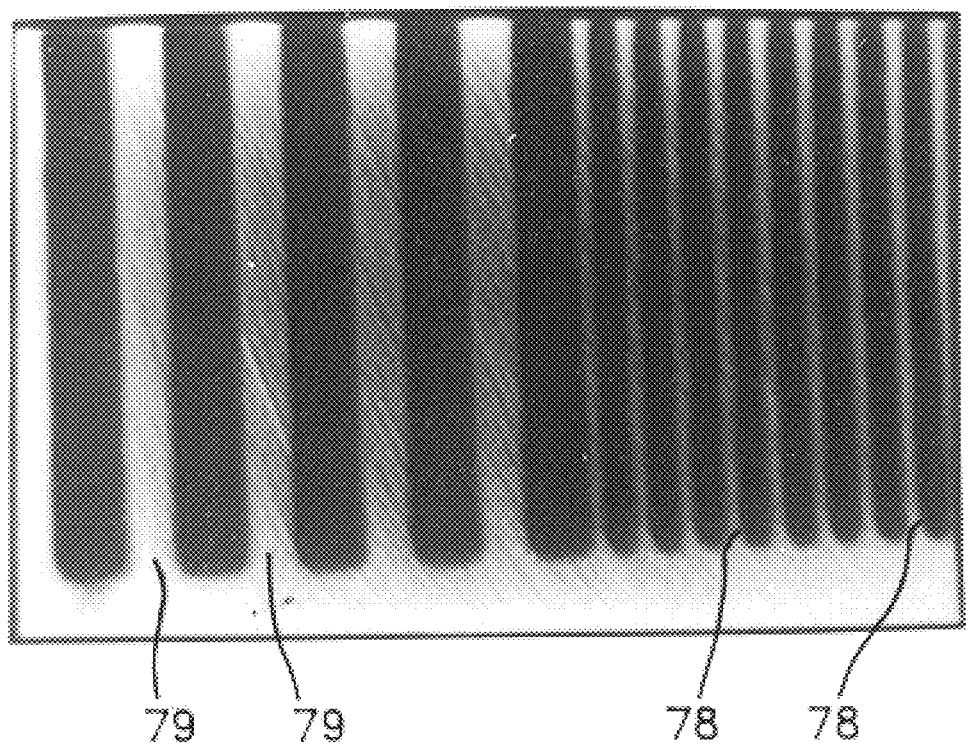
FIG_12

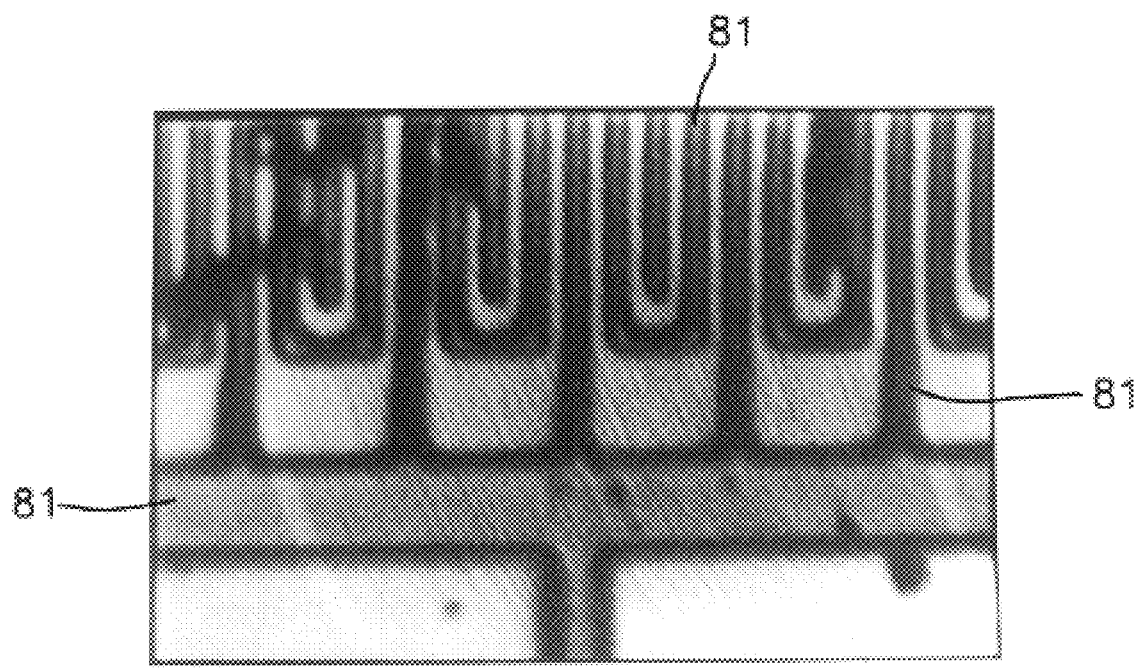
FIG_ 13
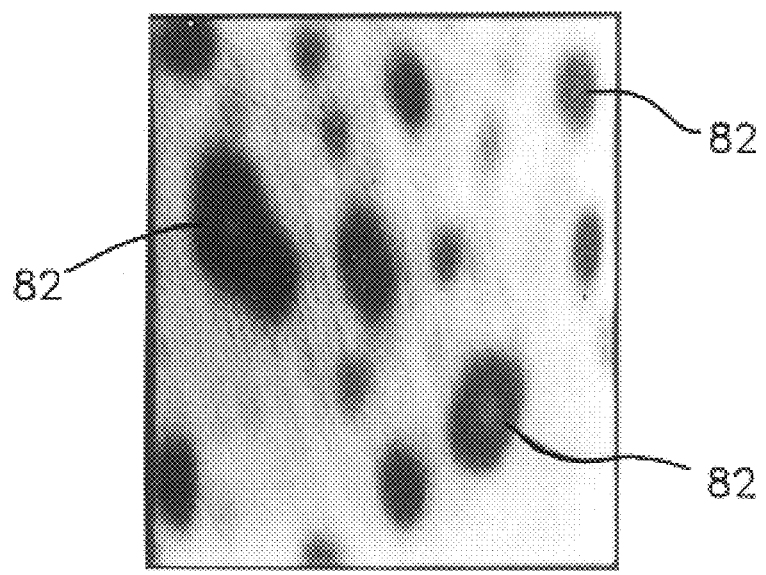
FIG_ 14

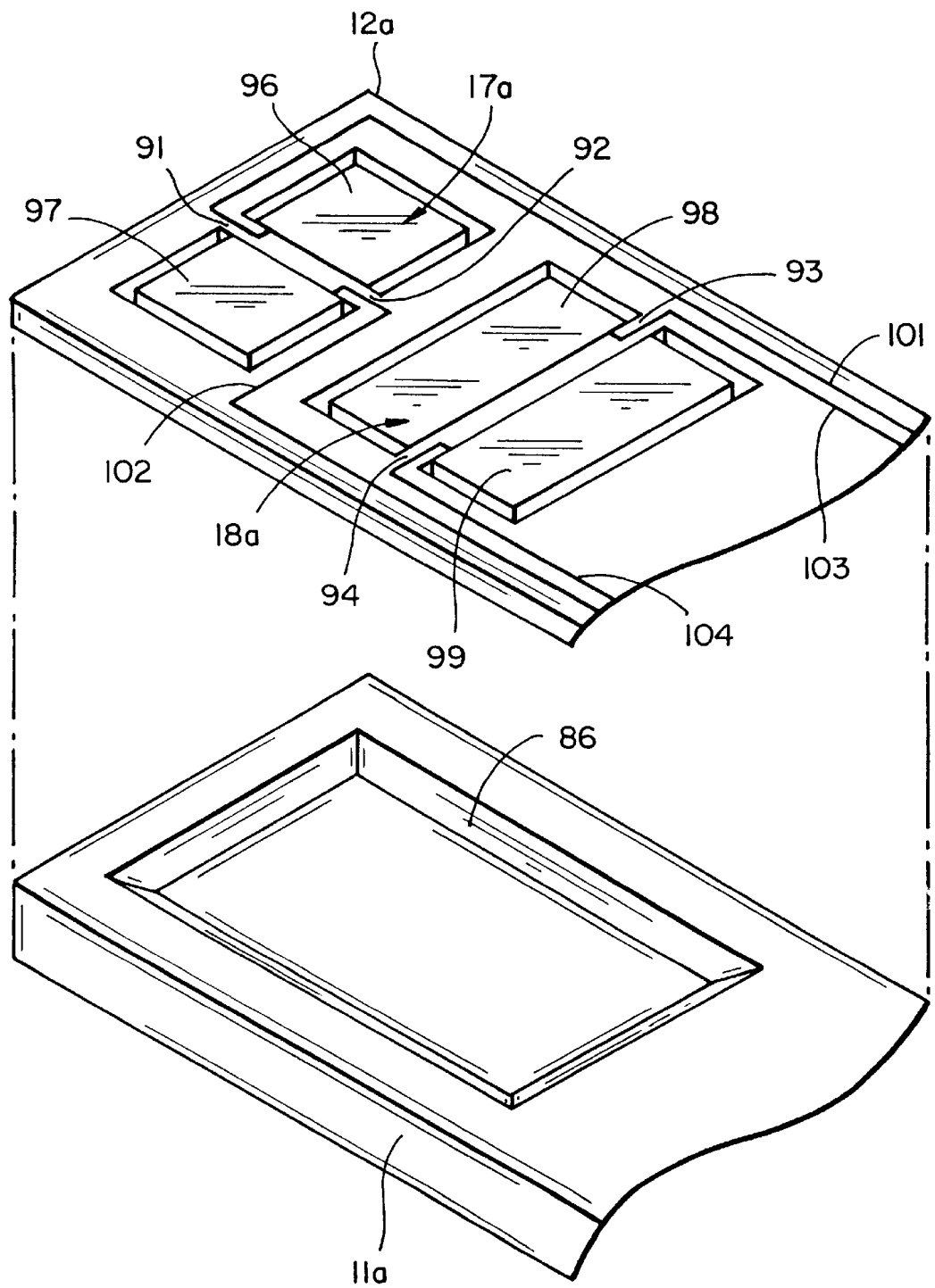
FIG_15

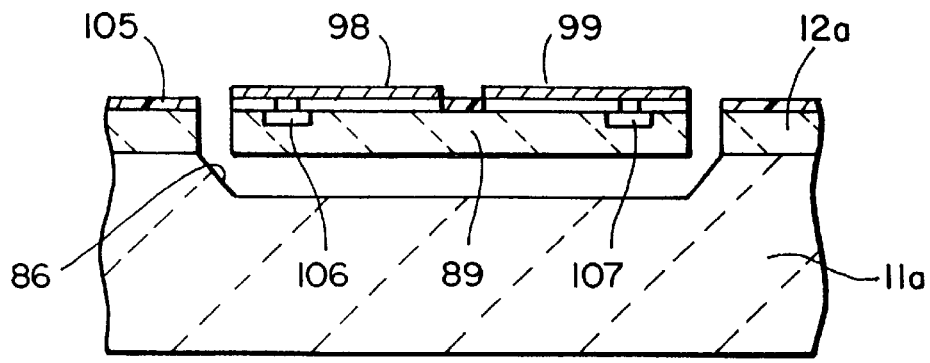
FIG_16
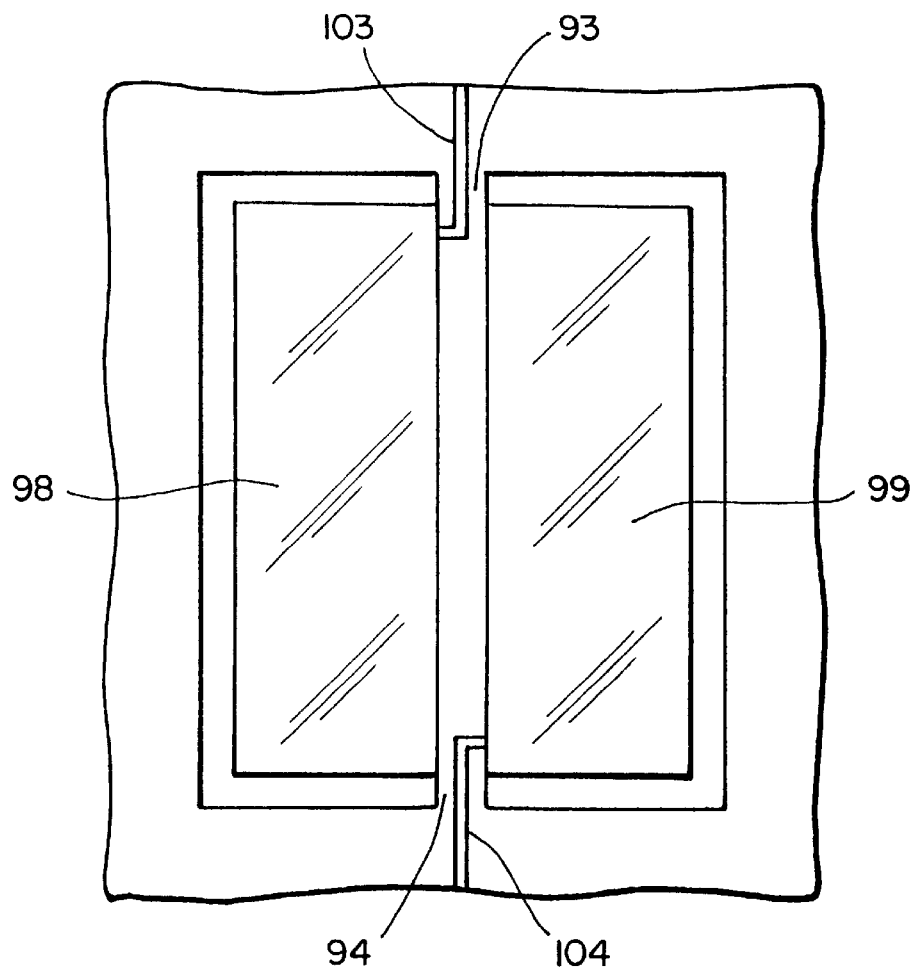
FIG_17

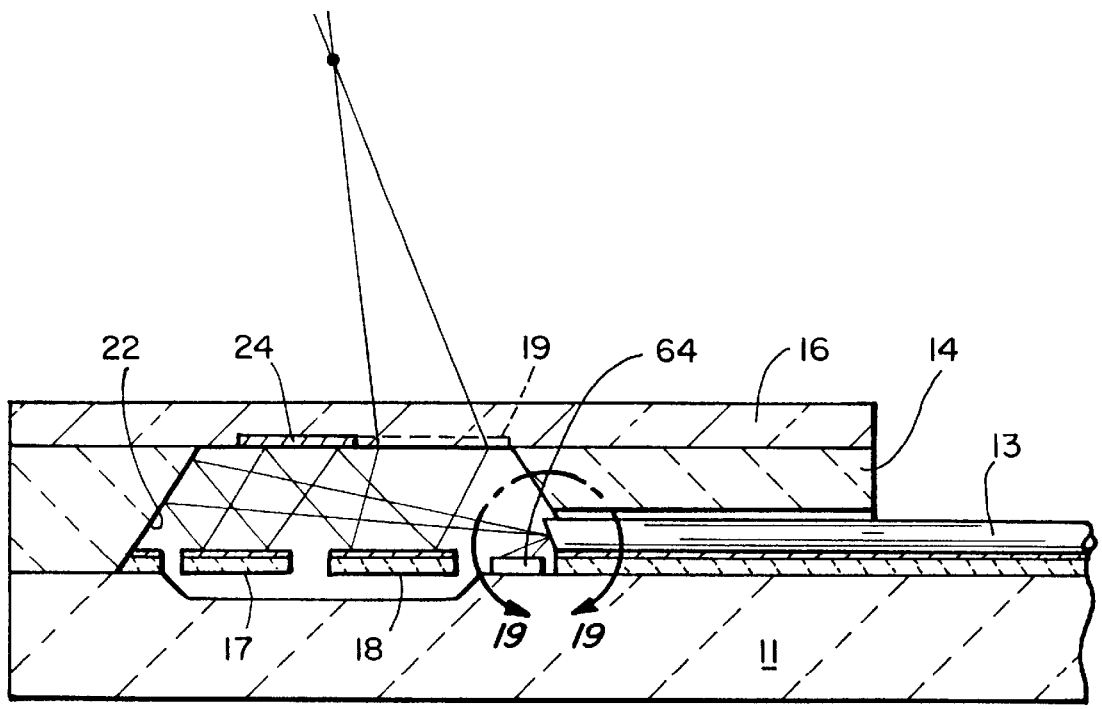
FIG_18
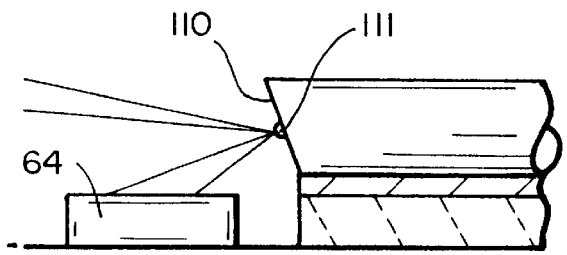
FIG_19a
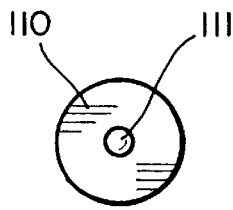
FIG_19b

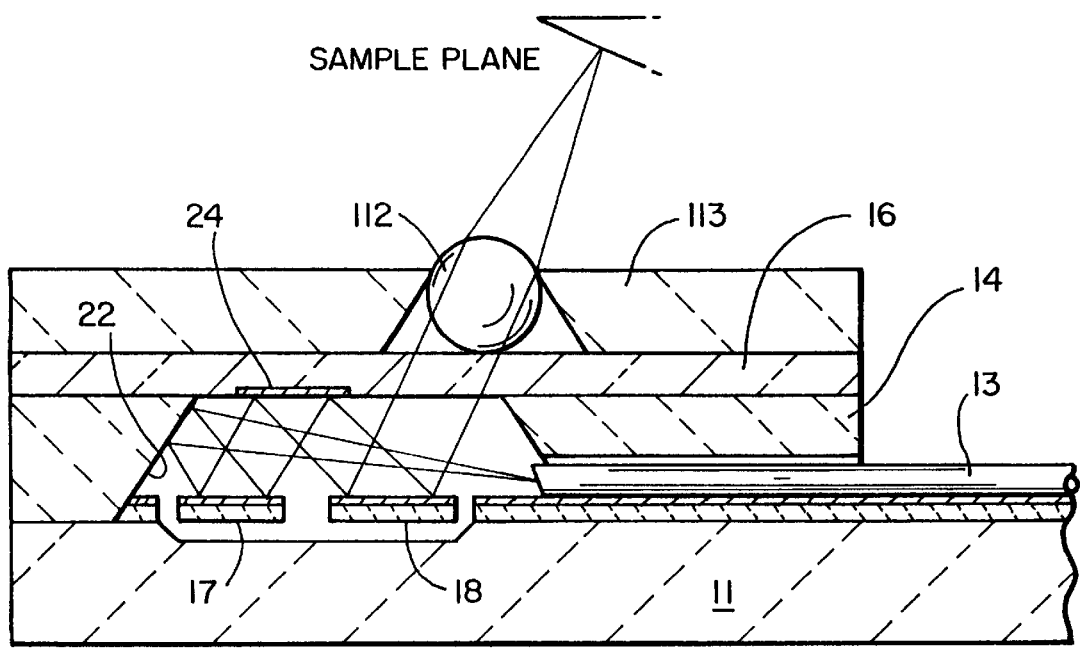
FIG_20
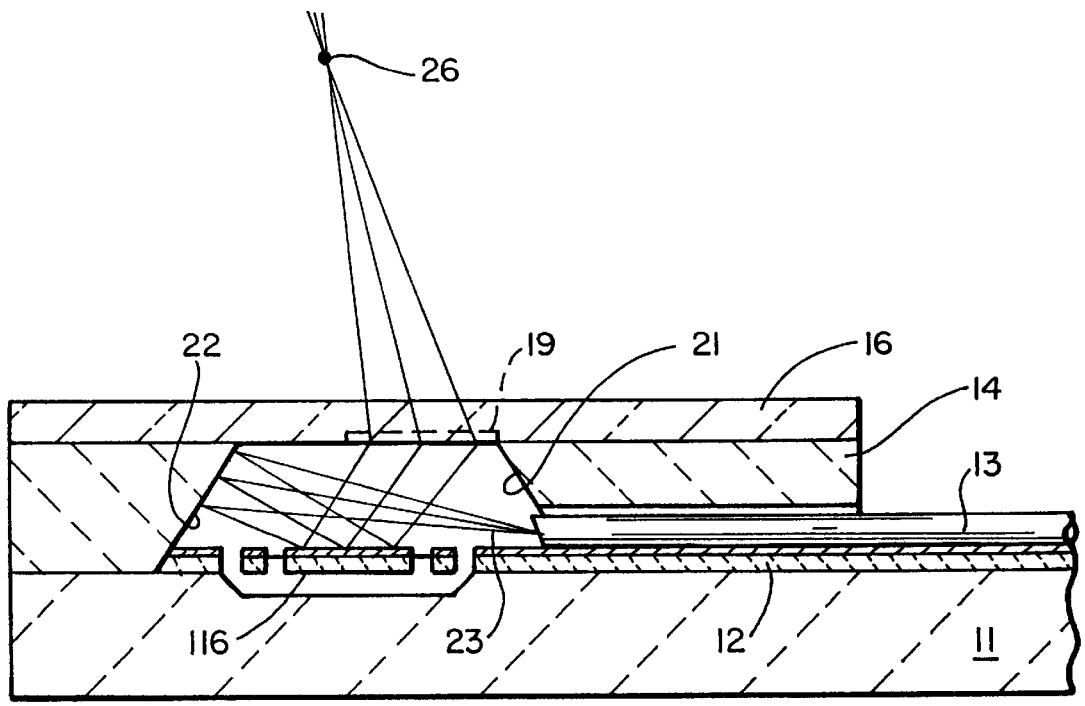
FIG_21

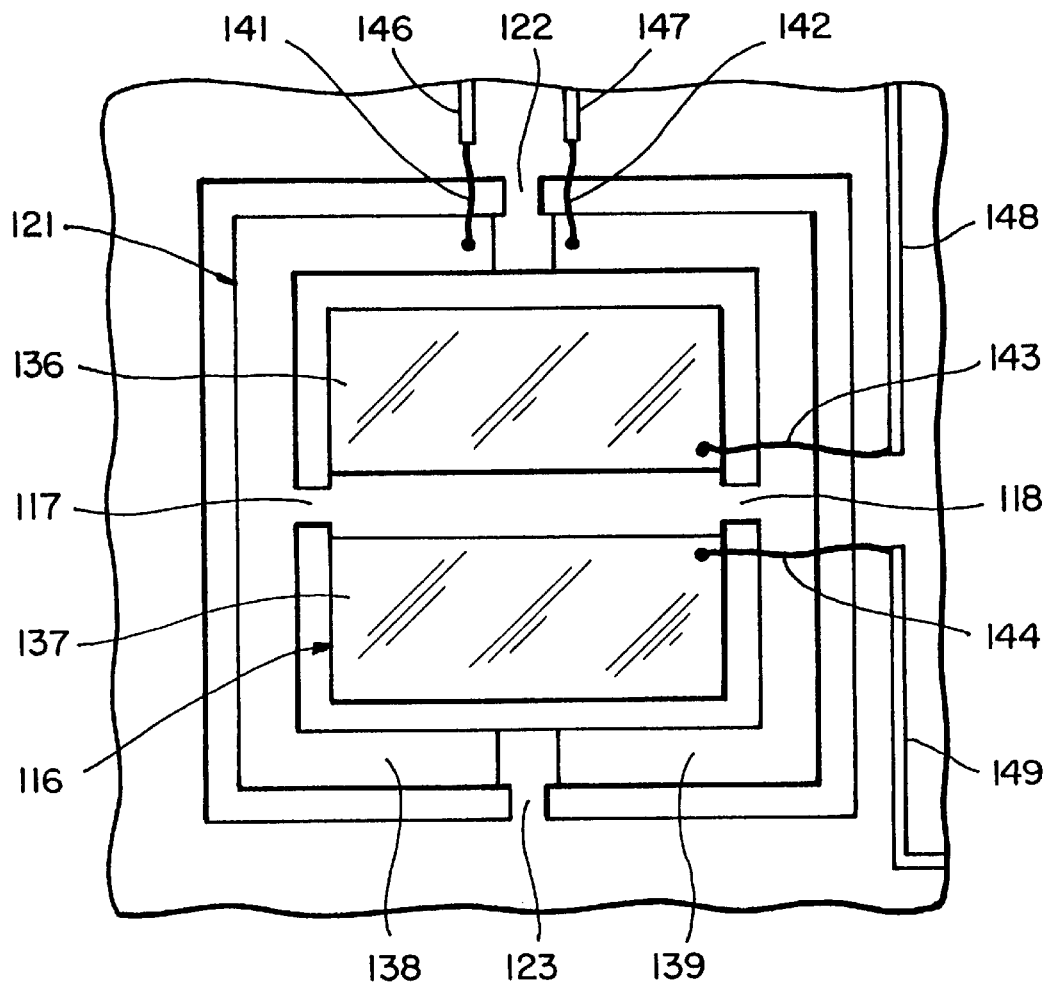
FIG_22
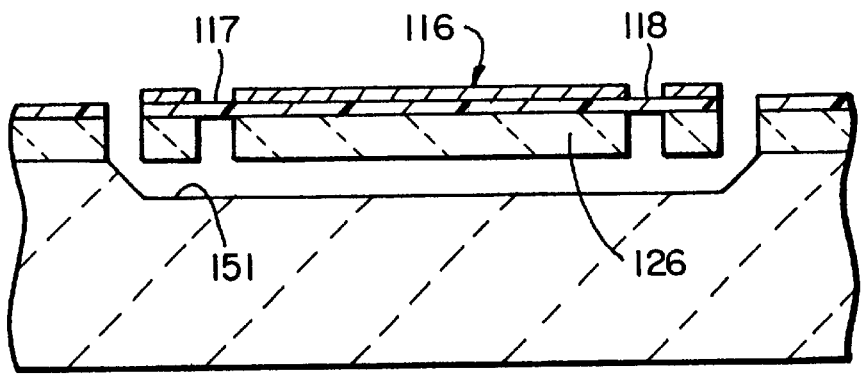
FIG_23

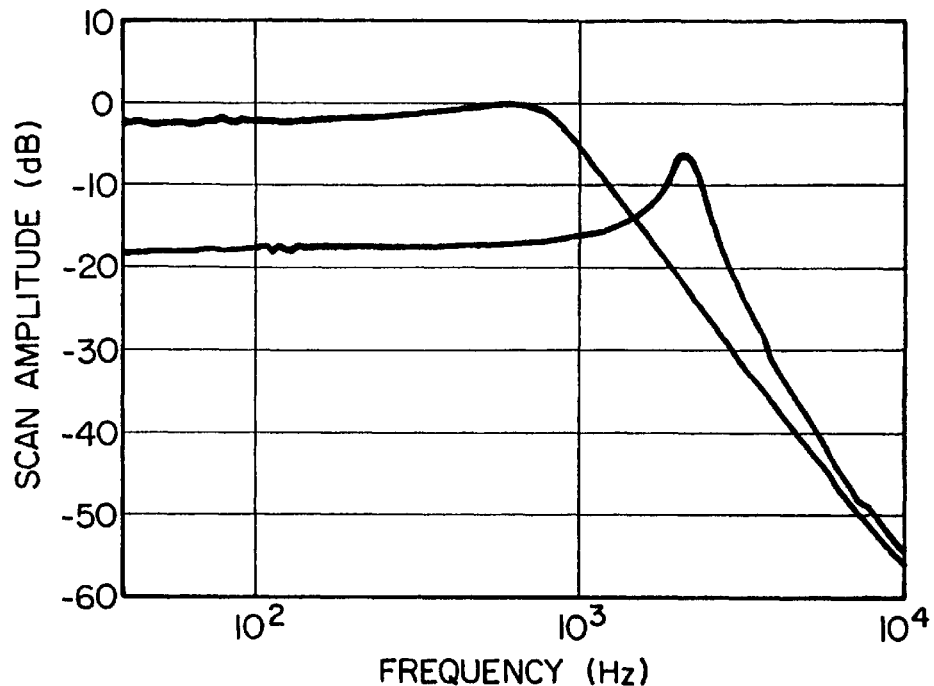
FIG_24
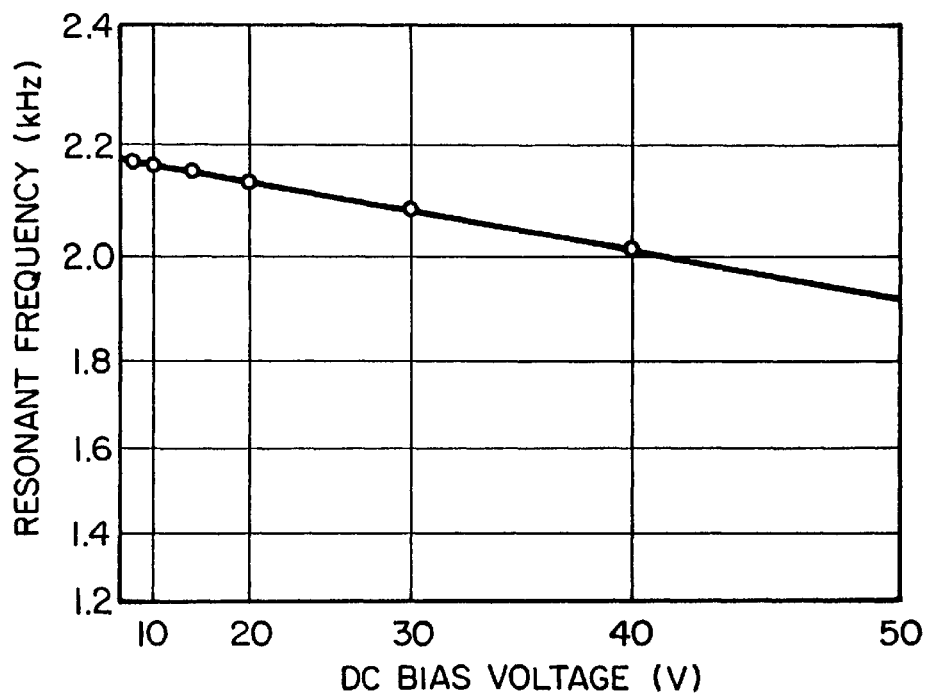
FIG_25

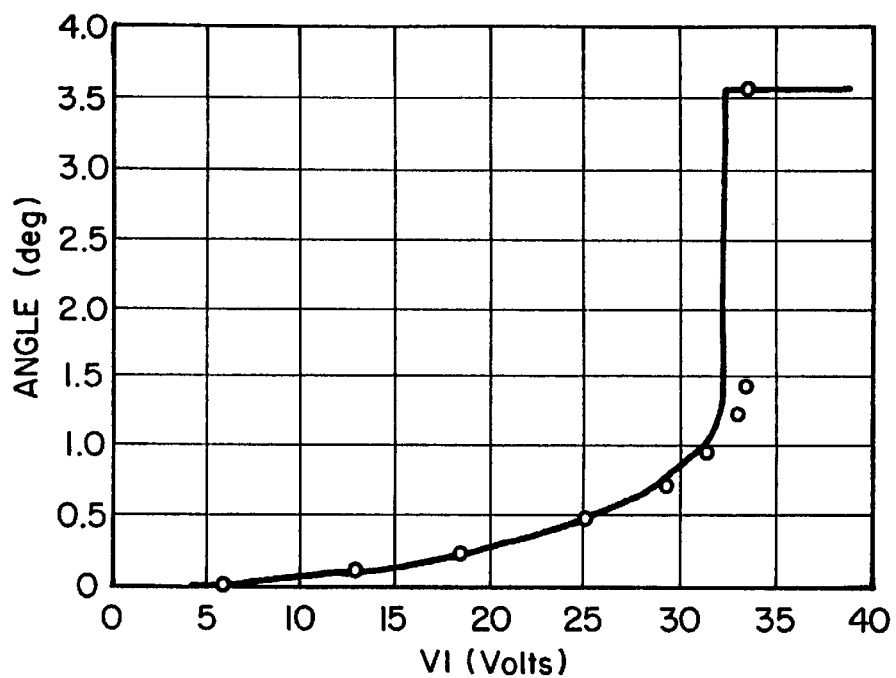
FIG_26
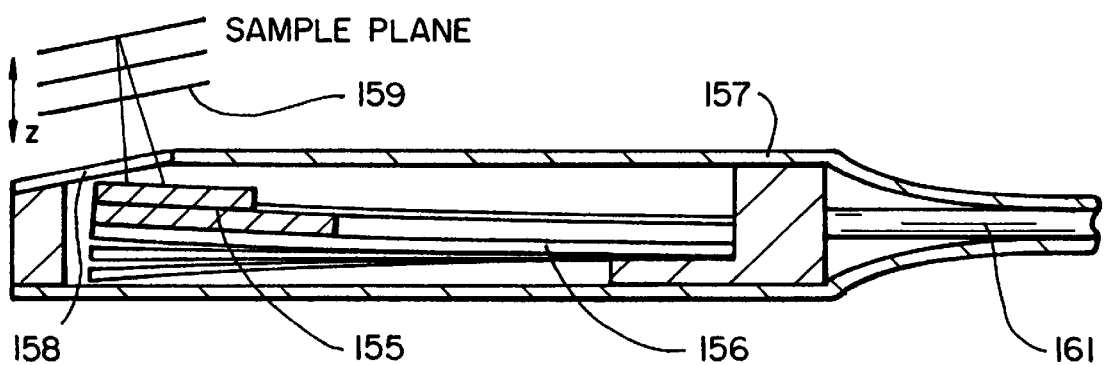
FIG_28

MINIATURE SCANNING CONFOCAL MICROSCOPE

REFERENCE TO RELATED APPLICATIONS

The present application is a Continuation of U.S. patent application Ser. No. 08/797,931 filed Feb. 12, 1997, which is a continuation in part of U.S. patent application Ser. No. 08/575,687, filed Dec. 19, 1995 now U.S. Pat. No. 5,742,419.

BRIEF DESCRIPTION OF THE INVENTION

This invention relates generally to miniature confocal microscopes and more particularly to scanning confocal microscopes using micro-machined mirrors.

BACKGROUND OF THE INVENTION

The standard optical microscope, used routinely in biology, medicine and semiconductor processing, is large. Typically, samples of tissue are observed in vitro after being mounted on a microscope slide. Such microscopes are not suitable for in vivo observations of the skin or internal organs of the human body; they are just too large. Consequently, there is a need for a small microscope which could be used for observations of melanomas of the skin, and the teeth and gums, and for endoscopy of cells inside arteries and veins and organs of the body. Ultimately, if such a microscope could be mounted inside a hypodermic needle, it would be suitable for taking in vivo biopsies and for observing microscopic features of the body, such as the flow of blood and plasma in veins, arteries, and other vessels of the body, the fluid in tear ducts, and the general condition of small vessels. Although we have described biological applications of a miniature microscope, the miniature microscope of the present invention can be used in endoscopes passed through small pipes, and for use in-situ observation during processing of semiconductors and other materials.

The present tendency is to carry out clinical procedures with small tools mounted in catheters, to make internal observations inside vessels with fiber optic devices, and to carry out operations using laser and fiber-optic techniques. Much less damage is done to the body than with older surgical methods by using such procedures. Observations of what is being done on a microscopic scale would be helpful, since the best resolution that presently can be obtained with endoscopes is of the order of 10–20 µm. Another example is the observation of cancer cells in the uterus, where it is extremely painful to carry out biopsies. An in vivo imaging technique for this purpose which leaves the tissue intact would be a considerable improvement over present practice.

Several fiber optic microscopes have been suggested in the past, but either they are too bulky or too slow, so that the frame time is of the order of several seconds, or the definition is very poor[1-6]. Thus, these microscopes are not suitable for in vivo real-time imaging at the microscopic level.

We reported a vibrating fiber microscope in a recent paper[7]. A Fresnel lens made by photolithographic means was mounted on the end of a vibrating glass rod approximately 0.8 mm square. The lens was illuminated from an optical fiber glued to the other end of the rod, and formed a spot of the order of 1.8 µm in diameter at an approximate distance of 1 mm from the lens. Light reflected from the object being observed was passed back through the fiber and lens to a detector. The signal from the detector, after suitable processing, was displayed through an image converter as a video image. The rectangular-shaped rod was vibrated by electrostatic fields, applied between it and an outer tube, at its slightly different mechanical resonant frequencies in the x and y directions. Hence, the focused spot from the lens formed a raster pattern (a Lissajous figure). The vibration frequencies were of the order of 8 kHz, and a single frame of the image took about 1/20 second to form. The resolution was about 2 µm. This microscope suffered from the disadvantage that the vibrating rod needed support from a rigid and massive structure, which made the supporting structure large and unsuitable for use in the body.

OBJECTS AND SUMMARY OF THE INVENTION

It is an object of this invention to provide a micro-machined miniature scanning optical microscope.

It is another object of the invention to provide a miniature scanning optical microscope using micro-machined, electrostatically actuated scanning mirrors.

It is still another object of the invention to provide a miniature scanning optical microscope using micro-machined, electrostatically actuated scanning mirrors and a micro-machined binary lens.

There is provided a scanning optical microscope which incorporates electrostatically actuated scanning mirrors disposed between a single-mode optical fiber light source/detector and a focusing objective lens.

BRIEF DESCRIPTION OF THE DRAWINGS

The foregoing and other objects of the invention will be more fully understood from the following description read in connection with the accompanying drawings, of which:

FIG. 1 is a perspective view of a miniature confocal scanning microscope in accordance with the invention;

FIG. 2 is an exploded view showing the parts of the microscope of FIG. 1;

FIG. 3 is a sectional view taken along the line 3—3 of FIG. 1;

FIG. 4 is a sectional view taken along the line 4—4 of FIG. 1;

FIG. 5 is a sectional view taken along the line 5—5 of FIG. 1;

FIG. 6 shows the zone plate line schematically illustrated in FIGS. 1 and 2;

FIG. 7 shows the angles employed in the design of an off-axis zone plate lens;

FIG. 8 shows the optical fiber illumination/detection configuration;

FIG. 9 shows an open-loop electronic drive circuit associated with the scanning mirrors and the signal processing circuit;

FIG. 10 shows a closed-loop electronic drive circuit associated with the scanning mirrors and the signal processing circuit;

FIG. 11 shows an image of chrome lines on a glass substrate taken with a microscope in accordance with the invention;

FIG. 12 shows another image of chrome lines on a glass substrate taken with a microscope in accordance with the invention;

FIG. 13 shows an image of a silicon test structure taken with a microscope in accordance with the invention; and FIG. 14 shows an image of red blood cells taken with a microscope in accordance with the invention.

FIG. 15 is an exploded view of another embodiment of the scanning mirrors and substrates shown in FIGS. 1–4.

FIG. 16 is a partial sectional view of one of the scanning mirrors shown in FIG. 15.

FIG. 17 is a top plan view of the mirror shown in FIG. 16.

FIG. 18 is a sectional view of a scanning microscope incorporating a detector.

FIG. 19a is an enlarged view of the portion 19—19 of FIG. 18.

FIG. 19b is an end view of the single mode optical fiber.

FIG. 20 is a sectional view of a scanning microscope head showing a refractive focusing lens.

FIG. 21 is a sectional view of a scanning microscope employing a biaxial scanning mirror.

FIG. 22 is a top plan view of the biaxial scanning mirror of FIG. 21.

FIG. 23 is a sectional view of the biaxial scanning mirror of FIG. 22.

FIG. 24 shows the frequency response of both the inner plate and the combined inner plate and outer frame.

FIG. 25 shows the frequency response for the inner plate for a range of values of common mode dc bias voltage.

FIG. 26 shows the angular deflections of mirror and frame as a function of dc bias voltage.

FIG. 28 shows a miniature confocal scanning microscope mounted in a hypodermic tubing.

DESCRIPTION OF THE PREFERRED EMBODIMENTS

Figure 27:
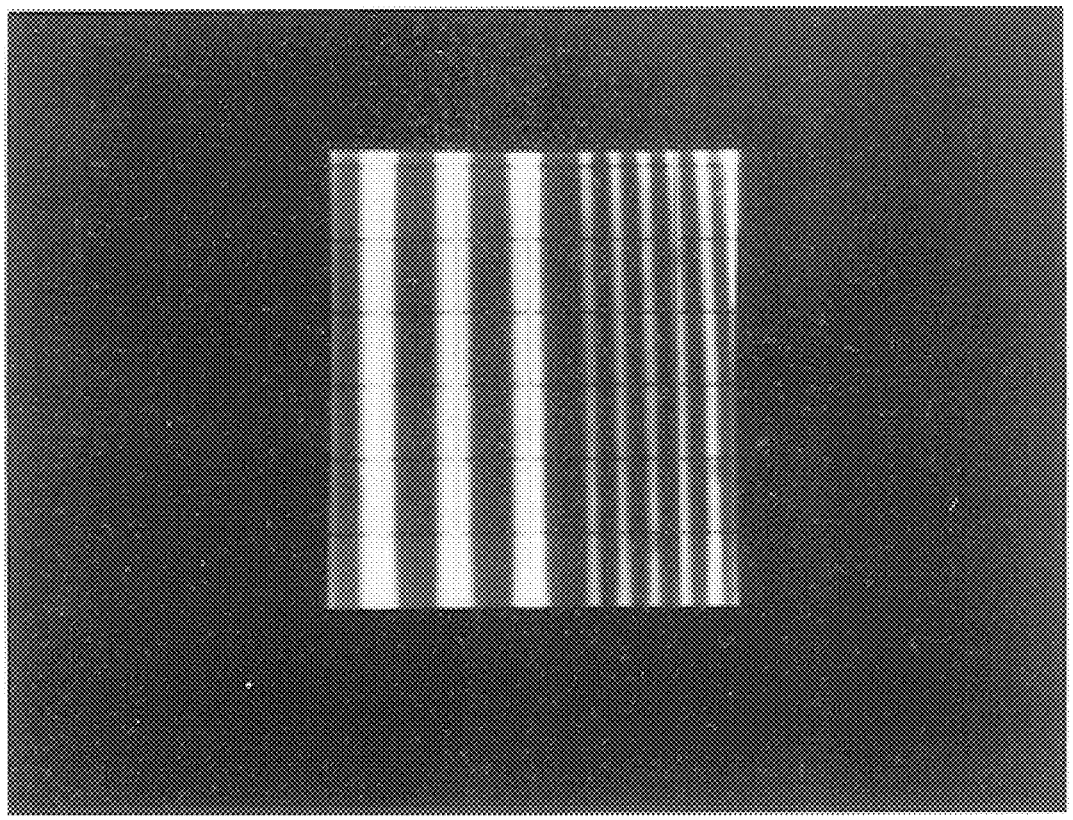
FIG. 27 shows a chrome bar target image by a microfabricated confocal microscope in accordance with FIG. 21.

A miniature scanning confocal microscope in accordance with the invention is illustrated in the perspective view of FIG. 1, the exploded view of FIG. 2 and the sectional views of FIGS. 3–5. The microscope includes a silicon substrate 11, a bonded silicon plate 12, a single mode optical fiber 13, a silicon spacer 14 and a fused silica lens plate 16 bonded to the silicon spacer 14. The plate 12 includes a pair of micro-machined scanning mirrors 17, 18 disposed between the single mode optical fiber 13 and a miniature objective lens 19 formed in the silica lens plate 16. The silicon spacer comprises <100> silicon which is etched to form an opening 21 which forms a <111> face 22. Referring to FIG. 3, the light beam 23 from the fiber 13 is first reflected from the etched <111> face 22 onto the first scanning mirror 17, then from a metallized mirror 24 on the lens plate 16 back to the second scanning mirror 18. The light beam is then reflected from the second scanning mirror 18 and passes through an off-axis zone plate objective lens 19 etched into the fused silica lens plate 16. The lens images the output from the fiber to a point 26 on the sample plane. As the mirrors rotate, this point is scanned through the field of view. Light reflected back from the sample is re-imaged by the lens 19, back along the same path to the fiber, and is detected and processed to create an image. Since the fiber behaves like a small pinhole, the device is a confocal microscope with the range and transverse resolution to be expected from a confocal scanning-optical microscope.

The mirror scanners are fabricated using silicon micromachining techniques. Micro-machined torsional mirrors for use in scanners and spatial light modulators have been reported by numerous authors.[8–14] The rotational axes of the two mirrors are orthogonal, so that one mirror scans the light beam in the x-dimension and the other mirror scans it in the y-dimension. As will be presently described, the mirrors 17, 18 are electrostatically rotated.

The silicon substrate 11 is masked and etched to form spaced wells 28, 29 below the mirrors 17, 18 whereby the mirrors can rotate. The substrate is masked and impurities are implanted into the substrate to form conductive regions. More particularly, two conductive regions 31, 32 are formed at the bottom of well 28 and two conductive regions 33, 34 are formed at the bottom of the well 29. These regions are connected to ion-implanted contact regions 36, 37 and 38, 39 by ion-implanted leads 41, 42 and 43, 44. A bonding thermal oxide layer 46 is formed on the surface. A silicon nitride cap is formed over the oxide in the wells 28, 29 to provide insulation during a subsequent metallization step.

The silicon plate 12 is bonded to the substrate via an oxide layer on the plate and the substrate oxide 46. A silicon nitride layer 47 is formed on the plate 12 and by suitable masking and etching, windows 51, 52 and 53, 54 are formed to expose the contact regions 36, 37 and 38, 39. The mirrors 17, 18 are defined by etching the slots 56 leaving silicon nitride strips 57, which serve as hinges. The etching removes the silicon from beneath the hinges while leaving the silicon under the mirror surfaces to provide a rigid mirror. After the mirrors have been defined, a conductive layer is deposited on the top of the silicon plate to provide, on the surface of the mirrors, a reflective surface and one plate of a capacitor which cooperates with the conductive regions 31, 32 and 33, 34 to provide electrostatic forces which cause the mirrors to rotate at the hinges. Actuation of the mirrors is accomplished by applying voltages between the conductive film on the surface of the mirror and the individual implanted regions 31, 32 and 33, 34. The conductive film also covers the implanted contact regions 36, 37 and 38, 39. The film at the upper surface of the plate is not in contact with the film at the contact areas.

The off-axis zone plate lens, FIG. 6, is fabricated using electron beam lithographic pattern transfer and anisotropic reactive ion etching. The angles at which the light beam enters and exits the lens are specifically designed so that the beam emitted from the lens is well focused throughout the field of view, with no second order aberrations. The local structure of the lens grating has itself been optimized to increase the efficiency of the lens relative to a similar lens designed for on-axis imaging.

The quality of the image formed by the microscope is governed by the design of the lens. Traditional microscope objectives have many glass elements all of which are combined to reduce the aberration of the image to a minimum. For this invention, one benefits from the use of a very simple, single element objective. Because a laser source illumination at a single wavelength of light is used, one can use a diffractive lens rather than the more usual refractive type. This is a distinct advantage from a manufacturing point of view since a diffractive lens can be made lithographically with tight control over the pertinent design parameters. One gives up, however, the expectation of performing aberration-free imaging when one chooses to implement the microscope with a single diffractive lens element.

The aberrations of axially symmetric grating lenses are well known. For this application, one desires high resolution and, therefore, high numerical aperture in the objective lens. The primary aberration (so-called third order aberration) that limits numerical aperture in an axially symmetric grating lens with the stop at the lens is coma.

With the zigzag optical path used for the microscope, one requires a lens that is not axially symmetric, but is designed to create an image from a beam of light that is incident at an angle from the lens normal. In general, such an off-axis lens will suffer from a more serious second order aberration called linear astigmatism. It has been discovered, however, that if the angles of incidence of the object beam and the image beam are chosen properly then the second order astigmatism disappears and imaging is again governed by third order coma. The constraint on the angles is that $$\sin(\alpha_1)/r_1 = \sin(\alpha_2)/r_2 \qquad (1)$$

where the angles $\alpha_1$, $\alpha_2$, $r_1$ and $r_2$ are defined in FIG. 7.

The phase function of this lens is such that the points in the center of the field of view, $P_1$ and $P_2$ are perfect images of one another.

When the microscope is constructed with regard to this constraint on the angles made by the incoming and exiting beams with the normal to the lens plane, then the imaging aberrations of the off-axis lens are quite similar to the aberrations of the more familiar, axially symmetric lens. Any significant deviation from this relationship would result in an instrument with extremely poor performance, and therefore the geometric relationship described above is paramount to the operation of the microscope. On the other hand, the fact that there exists a situation favorable to off-axis imaging enables one to implement the microscope with a zigzag optical path, keeping the overall dimensions very small and the design simple.

Note finally from the figure that the object and image planes are normal to the direction the beam of light is traveling. This is important for a reflection microscope, since the lens must collect the light reflected from the sample. If the sample plane was tilted with respect to the incoming beam, then the reflected light would not retrace its path back into the lens.

The single mode optical fiber illumination/detection system is shown in FIG. 8. A light source 61, such as a 3 mw helium-neon laser at 632.8 nm supplies light to one end of a single-mode optical fiber 62 which is used as a flexible conduit to deliver light to the fiber 13 which serves as the point source and detector for confocal operation of the microscope. The single lens focuses the light from the fiber onto the sample and collects the back-scattered light. A directional coupler 63 directs the reflected light from the sample onto photodetector 64 to provide an output signal 66.

The scanning microscope electronic interface is simple in principle. Referring to FIGS. 9 and 10, each scanning mirror is driven by two symmetrically placed electrodes 31, 32 and 33, 34, one on either side of the rotational axis. Application of a voltage between the electrode and the mirror plate results in an attractive electrostatic force proportional to the square of the magnitude of the voltage. To tilt the mirror one way or the other, a voltage is applied to one electrode at a time causing the mirror to deflect toward that electrode. For oscillatory motion in the x and y direction, a sinusoidal drive voltage 67 is applied to one of the electrodes 31, 33 with a DC bias sufficient to keep the voltage always positive. The opposing electrodes 32, 34 receive a drive voltage 68 with the opposite phase, so that as one side of an electrode sees the maximum voltage the other side sees zero voltage resulting in a net torsional force at the mirror. The frequency of the drive signal may be adjusted to cause the mirror to oscillate at its natural resonance or off resonance. Near resonance, the motion of the mirror will be phase shifted relative to the drive voltage waveform. In order to form an image from the detected light reflected from the sample, it is necessary to know the precise position of the mirror. A scan converter 69 is used for this purpose, which takes as its input the drive signals and the detected optical signal from the fiber, and produces as its output a raster scanned image suitable to display on a monitor 71 or for capture on a computer 72.

There are two possible control schemes. The simplest is open loop control, FIG. 9, where it is assumed that the kinetic response to the mirrors is known well enough that one only need to monitor the drive voltage in order to predict the mirror position. Then the scan converter maps the intensity of the detected optical signal to the calculated position of the beam. The other scheme is closed loop control, FIG. 10, where the position of the mirrors is independently monitored and this information is used in a feedback scheme that attempts to lock the motion of the mirrors to the drive voltage waveform. One of the simplest ways to monitor the position of the mirror is to measure the capacitance between the mirror plate and the drive electrodes. This capacitance will vary with the angular position of the mirror, so that monitoring the capacitance fluctuation provides a direct measure of the mirror position. With closed loop control, the control loop is capable of making the mirror motion exactly follow the drive voltage, so that the scan converter may use the x and y drive signals directly to map the intensity to the proper position of the beam, without any specific knowledge of the mirror kinetics.

A microscope was constructed which was 6 mm long, 2.5 mm wide and 1 mm high. The scanning mirror 17 was 300 $\mu$m by 360 $\mu$m and the scanning mirror 18 was 500 $\mu$m by 600 $\mu$m. The single mode optical fiber 13 was 125 $\mu$m in diameter.

The microscope was operated to provide both raster-scan and lissajous-scan images. In the first example, the microscope was used to scan a glass substrate provided with chrome lines 2 $\mu$m wide on 4 $\mu$m centers and a 5 $\mu$m line. The mirror 17 was scanned at a frequency of 2.71 kHz with approximately 20V peak-to-peak sinusoidal voltage. The mirror 18 was driven at a frequency of 5 Hz with approximately 25 peak-to-peak sinusoidal voltage. The field of view was 30×24 $\mu$m. The resulting raster-scan image is shown in FIG. 11, which has 271 lines/frame at a frame rate of 5 Hz. The 2 $\mu$m lines are shown at 76 and the 5 $\mu$m line is shown at 77.

In the second example, the microscope was used to scan a glass substrate with chrome lines 2 $\mu$m wide on 4 $\mu$m centers and 5 $\mu$m lines on 10 $\mu$m centers. The mirror 17 was scanned at a frequency of 4.3 kHz with approximately 30V peak-to-peak sinusoidal voltage. The mirror 18 was driven at a frequency of 1.07 kHz with approximately 25V peak-to-peak sinusoidal voltage. The field of view was about 80 $\mu$m×60 $\mu$m. The resulting lissajous-scan image is shown in FIG. 12. The frame rate was 8 Hz with 268 lines/frame. The 2 $\mu$m and 5 $\mu$m lines are shown at 78 and 79.

In another example, the microscope was used to scan an etched silicon test structure having U-shaped trenches. The mirror 17 was scanned at a frequency of 4.3 kHz with 30V peak-to-peak sinusoidal voltage, giving a field of view of 80 $\mu$m×60 $\mu$m. The resulting Lissajous-scan image is shown in FIG. 13. The trenches are shown at 81. The frame rate was 8 Hz with 268 lines/frame.

In a fourth example, the microscope was used to scan red blood cells on a glass slide. The mirror 17 was scanned at a frequency of 4.3 kHz with a 30V peak-to-peak sinusoidal drive voltage. The mirror 18 was driven at a frequency of 1.07 kHz with a 15V peak-to-peak drive voltage. The field of view was 40 $\mu$m×60 $\mu$m. The resulting Lissajous-scan image is shown in FIG. 14. The red cells are shown at 82. The frame rate was 8 Hz with 268 lines/frame.

FIGS. 15–17 show another embodiment of electrostatically rotated scanning mirrors for miniature scanning confocal microscope in accordance with the present invention. A bonded wafer technique was employed to fabricate the electrostatically deflected mirror assembly. A substrate 11a was prepared with a clearance well 86. Then a second silicon wafer 12a was bonded to the substrate. The silicon wafer was micromachined to form the mirror plates. The mirrors 17a, 18a, each consist of a silicon plate. Note, silicon plate 89 is shown in FIG. 16, supported by torsion hinges 91, 92, and 93, 94. The hinges are made of a low stress silicon nitride. In one example, the mirrors were 500 µm by 500 µm and 25 µm thick. The mirrors were separated from the silicon substrate 12a by a gap of approximately 25 µm. The mirrors were actuated by electrostatic attractive forces when a voltage was applied across the gap between reflecting metal electrodes 96, 97 and 98, 99 formed on top of the top surface of the silicon plates. The metal electrodes serve both as the reflective mirror surface and as a drive electrode for actuation of the mirror on its hinges. Connection to the two sets of electrodes is made by leads 101, 102, 103, formed as a thin film on the top surface of the silicon nitride layer.

The starting material for the substrate 11a was [100] p-type silicon, 0.1 Ω-cm. The substrate was prepared with a thin thermal oxide layer for bonding and then the well 86 was patterned and etched into the substrate to the desired depth using reactive ion etching. The starting material for the top plate wafer 12a was [111] p-type silicon, 5000 Ω-cm. It was also prepared with a thermal oxide layer and then bonded to the substrate 11a using a fusion bonding technique. The top plate was ground and polished to the desired final plate thickness of 25 µm. A 1000 Å thermal oxide layer was deposited followed by a 1 µm film 105 of low stress silicon nitride for the hinge material. Next, contact openings were patterned and etched through the silicon nitride and the underlying oxide, followed by a phosphorus implant and anneal to define n+ regions 106, 107 forming pn junctions between the metal electrodes 98, 99 and the p-type plate. Similar implant regions and pn junctions (not shown) were formed between the electrodes 96, 97 and the underlying p-type plate. The mirror outlines and hinges were then patterned and etched into the nitride layer, followed by deposition and patterning of the chrome-gold reflective electrodes. Finally, the silicon was etched anisotropically around the perimeter of the mirrors and beneath the hinges using a mixture of hydrofluoric, nitric and acetic acids (HNA), and the structure was released by etching the underlying bonding oxide. This provides a pivot plate 89 which is coupled to the semiconductor substrate by hinges 91, 92, pivotable about the axis of the hinges. The pivot plate 89 is formed with an external face for having a first terminal (metal electrode) and an internal face between the external face and the substrate. A depletion region is formed between the external and internal face by a p-n junction and a depletion region is increased by the application of voltage across the p-n junction and causes the plate to pivot. The surface of the electrode includes a reflective surface. The complete substructure is shown in FIGS. 15–17.

Using a silicon plate for the mirror, insures a rigid, optically flat surface that did not distort during scanning and at a thickness of 25 µm. It suffered minimal bowing from the intrinsic stress in the silicon nitride film. To actuate the plate, it is necessary to establish a voltage across the gap between the plate and the substrate. In order to accomplish this using electrodes deposited on the top of the plate, the silicon support or wafer must be depleted of free carriers beneath the driving electrode. To assure depletion through the 25 µm thick plate, high resistivity silicon was used for the plate. The metal electrodes as described were electrically connected to the silicon plate through a pn junction as illustrated in FIGS. 1–6. When a voltage difference was applied between the driving electrodes, the pn junction under the more positive electrode was reversed biased and the full region beneath the electrode was depleted to a depth W given approximately by the formula $$W = (2\varepsilon(V - V_{bi})/qn_a)^{1/2} \quad (2)$$

where ε is the permitivity of silicon, V is the applied voltage, $V_{bi}$ is the built in junction potential, q is the electron charge and $n_a$ is the acceptor concentration for p-type silicon.

With selected resistivity for the mirror plates, the p-type silicon resistivity corresponds to an acceptor concentration of $n_a=2.6\times10^2$ cm$^{-3}$. Using the above relationship, the plate will be fully depleted for a differential voltage between the electrodes of approximately 2.5 volts. The electrostatically deflected mirror assembly describe in connection with FIGS. 15–17 simplifies the construction of a scanning mirror arrangement by eliminating the need for implanted regions and simplifies the electrical connections for application of deflection voltages. In other respects, the microscope operates in a manner previously described.

Rather than employing the fiber coupler 63 shown in FIG. 8, the confocal scanning microscope may employ a single mode optical fiber solely for the transmission of light to the scanning mirrors. A diode detector 64 may be placed adjacent to the inclined end 110 of the single mode fiber and a thin metal film dot beamsplitter 111 can be formed on the inclined end 110 of the fiber, FIGS. 18 and 19. The beam reflected from the object will then strike the inclined face of the fiber and be reflected downward by the metal beamsplitter to the diode 64 which will provide an output signal 66. By making the metal film the diameter to the fiber core, one will only get a signal from the diode 64 when the beam is focused on the core. The system acts as a confocal microscope. To eliminate reflectivity from the cladding surrounding the core of the fiber, the fiber may be provided with an anti-reflection coating (not shown).

The off-axis diffractive lens, FIG. 6, can be replaced by a refractive lens in the form of a glass sphere 112, FIG. 20, formed from a material with a high index of refraction and small dispersion such as zirconia, where n=2.2 to minimize aberrations. The sphere would be in the order of 1 mm diameter and held by lens holder 113. Other configurations could incorporate a tilted hemisphere which would give even less aberration. The surface of the scan mirrors can be modified to include a reflective diffractive lens (not shown) or a reflective phase plate (not shown). The purpose of such modification could be to replace the fixed lens or to function in concert with the fixed lens to provide aberration compensation.

We have found that the microscope can be shortened by replacing the two mirror arrangement with a biaxial mirror arrangement such as that illustrated in FIGS. 21–23. In FIG. 21, like reference numerals have been applied to the same pats as described with reference to FIGS. 1–6. The assembly is simplified in that it requires only one metallized mirror for deflecting the beam in both the x and y direction. The system is made by mounting the mirror 116 on hinges 117, 118 to a frame 121 supported by hinges 122, 123 from the plate 12a. The mirror consists of a silicon plate 126 supported by torsion hinges 117, 118 made of low stress silicon nitride. Frame and mirror plate are separated from the silicon substrate by a gap of approximately 25 µm. The mirrors are actuated by the electrostatic attractive forces when a voltage is applied across the gap. Two metal electrodes, 136, 137 serves both as a reflective mirror surface and as a drive electrodes for actuation of the mirror on the hinges 117, 118. Two additional electrodes 138, 139 on the frame are used for actuation of the frame in an orthogonal direction. Connection to both sets of electrodes are made by wires 141, 142, 143, 144 bonded to the electrodes and to thin film leads 146, 147, 148, 149 formed on the surface of the nitride film to be described. As before, the substrate was highly doped p-type silicon, 0.1 Ω-cm. The substrate was prepared with a thin thermal oxide layer for bonding and then the well 151 was patterned and etched into the substrate to the desired depth, 25 μm, using reactive etching. The starting material for the top plate was a substantially intrinsic p-type silicon, 5000 Ω-cm. It was also prepared with a thermal oxide and bonded to the substrate using a fusion bonding technique. The top plate was then ground and polished to the desired final plate thickness. A 1000 Å thermal oxide layer was deposited followed by a 1 μm of low stress silicon nitride for the hinge material. Next the contact openings for the pn junction were patterned and etched to the silicon nitride and underlying oxide followed by phosphorus implant anneal to define an n+ region beneath the contacts. The mirror outlines and hinges were patterned and etched into silicon nitride followed by deposition and patterning of chrome-gold electrodes. Finally, the silicon was etched anisotropically around the perimeter of the mirror and underneath the hinges using a mixture of hydrofluoric, nitric and acetic acids and the structure was released. The completed structure is shown in the FIGS. 22 and 23.

We have characterized the scan mirror in terms of their frequency response, and angular displacement as a function of applied drive signal. The dynamic behavior of the mirrors can be described, in the absence of damping, using the second order equation of motion given by $$T = I_p \ddot{\theta} + 2\frac{KG}{l} \quad (3)$$

where $I_p$ is the moment of inertia of either the plate or the plate and frame combined for motion about the inner and outer hinge axes, respectively. For the motion of the inner plate with dimension c along the hinge axis and b transverse to the axis, we have $$I_p = pcb^3t/12$$

where t is the plate thickness and p is the density of silicon (2.32 g/cm$^3$). The restoring torque of the nitride membrane hinges is θ2KG/l, where l is the hinge length, and G is the elastic modulus of the membrane in shear, which is related to the tensile elastic modulus E (Young's modulus) by Poisson's ratio v according to $$G = E/2(1+v).$$

The factor K is related to the polar moment of inertia of the nitride support arm. For a rectangular cross section, K is given by[10]

$$K = a\delta^3 \left[ \frac{1}{3} - 0.21\frac{\delta}{a}\left(1 - \frac{\delta^4}{12a^4}\right) \right] \quad (4)$$

where α is the width of the hinge and δ is the thickness of the nitride layer.

The torque on the plate is given by $$T = \int F(x)x dA \quad (5)$$

where x is assumed to be in the direction transverse to the hinge axis, and F(x) is the force per unit area, which can be written, for the range θ of through which the biaxial mirror can rotate, as $$F(x) = \frac{1}{2}\frac{\epsilon_0 V^2}{(s_0 - x\theta)^2}. \quad (6)$$

In this equation θ is the angle between the plate and the substrate.

Because the electrostatic forces are a function of the square of the applied voltage, it is often desirable to operate the device with a dc bias on the electrodes, so that the voltage is unipolar and the mirror response is at the same frequency as the drive voltage rather than twice that frequency. The presence of a dc bias will, however, alter the resonant frequency of the mirror. To see this effect, consider the behavior of the inner plate. One can let the voltage across the gap $V_{dc}$ be constant across the plate, and then expand the expression for the torque as a function of θ. For a small angular displacements, this becomes $$T_{dc} = \frac{1}{12}\frac{V_{dc}^2 \epsilon_0 b^3 c}{s_0^3}\theta + O(3) \quad (7)$$

where θ(3) means terms of order 3 or higher in θ. Now the equation of motion becomes $$\frac{1}{12}\frac{V_{dc}^2 \epsilon_0 b^3 c}{s_0^3}\theta = I_p \ddot{\theta} + \frac{2KG}{l}\theta. \quad (8)$$

This structure will have a resonant frequency given by $$\omega_0 = \left[\frac{2KG}{lI_p} - \frac{V_{dc}^2 \epsilon_0}{\rho t s_0^3}\right]^{1/2}. \quad (9)$$

Increasing the DC bias voltage has the effect of lowering the resonant frequency of the mirror plate.

FIG. 24 shows the frequency response of both the inner plate, and the combined inner plate and outer frame, for a particular mirror device. This data corresponds to a square mirror plate measuring 500 μm along a side and 25 μm thick. The hinge for the plate was 1 μm thick, 20 μm wide and 25 μm long. The outer frame is also square, with inner dimension 520 μm and outer dimension 720 μm. The hinge for the frame was 1 μm thick, 16 μm wide and 50 μm long.

Frequency data were measured for the inner plate of this particular mirror for a range of values of common mode dc bias voltage. In FIG. 25, the dependence of resonant frequency upon the bias voltage, which is described by Equation 9, is illustrated by plotting the square of the frequency vs. The square of the bias voltage. For voltages small enough that the plate-substrate separation h is constant, this relationship is linear. The y intercept of the curve is equal to the spring constant of the hinges divided by the moment of inertia of the plate. We can use this number to calculate the shear modulus G for the silicon nitride hinges. For this device, we find that G=6.5×10$^{10}$[N/m].

For real time, video rate scanning it is desirable to operate with a line scan frequency in the range of 8 to 10 kHz, and possibly higher for some applications. The highest resonant frequency we have measured with the current mirrors is 2.7 kHz. By increasing the hinge thickness to increase the spring constant, and decreasing the plate thickness to reduce the moment of inertia, this mirror architecture should easily scale to provide resonant line scanning at 10 kHz with a plate that measures 500 $\mu$m×500 $\mu$m.

For raster type scanning using the biaxial mirror, the outer plate is typically operated well below resonance, at a few Hertz to tens of Hertz. In this frequency range, we can approximate $\theta \approx 0$, and the angular displacement of the mirror is governed by the static equation $$T = \frac{2KG}{l}\theta \qquad (10)$$

We have measured the static displacement of the mirror and frame as a function of a dc voltage applied to one of the frame electrodes, with the center plate and the other frame electrodes all grounded. The results are plotted in FIG. 26. Also plotted in the figure is the theoretically predicted deflection which is calculated by evaluating the integral of Equation 5 over one side of the outer frame. We then use the following expression for the torque with the torque T given by the relation $$T = \frac{\epsilon_0 V^2}{2\theta^2}\left[c_2\left(\ln\left(1-\frac{\theta b_2}{2s_0}\right)+\frac{\theta b_2/2s_0}{1-\theta b_2/2s_0}\right) - c_1\left(\ln\left(1-\frac{\theta b_1}{2s_0}\right)+\frac{\theta b_1/2s_0}{1-\theta b_1/2s_0}\right)\right] \qquad (11)$$

where $b_1 = c_1 = 520$ $\mu$m are the frame inside dimensions and $b_2 = c_2 = 720$ $\mu$m are the frame outside dimensions. The only material parameter appearing in Equation 10 is the elastic shear modulus G. Using the number for G calculated from the frequency response data yields an excellent agreement between the theoretically predicted and measured static deflection as a function of applied drive voltage.

We have used the biaxial silicon torsional mirror as the scanning element in a microfabricated fiber confocal optical microscope[6,7]. The device, which is illustrated in FIG. 21, consists of a substrate wafer with the scan mirror fabricated on its surface, a second silicon wafer with a anisotropically etched cavity in which the light beam propagates, and a top plate made of used silica which contains the grating lens used to focus the light beam onto the sample being imaged. The light emerging from an angle polished single mode optical fiber is reflected from a stationary mirror on the etched cavity face, before it encounters the center plate of the biaxial scan mirror. The reflected light from the scan mirror passes through the objective lens and is focused to a spot on the sample. Light reflected from the sample is collected by the lens and retraces its path back into the fiber, where it is detected to generate a signal proportional to the sample reflectivity. Actuation of the scan mirror causes the focused spot to raster across the sample, and an image is formed point by point.

FIG. 27 shows an image of a test pattern of chrome lines on a glass substrate that was obtained with the microfabricated microscope and the biaxial scan mirror. The wider lines are 5 $\mu$m wide on a 10 $\mu$m period, and the narrower lines are 2 $\mu$m wide on a 4 $\mu$m period. The numerical aperture of the lens is 0.25, and the focused spot is 1 $\mu$m fwhm. The field of view for this image is 60 $\mu$m×60 $\mu$m (one division on the grid is 10 $\mu$m), corresponding to ±1.5° angular displacement of the scan mirror. This image was taken using a triangular frame scan at 10 Hz and a sinusoidal line scan at 1.8 kHz, without benefit of retrace blanking for either the line scan or the frame scan.

Referring to FIG. 28, a micromachined microscope 155 in accordance with the present invention is shown mounted on a PZT Bimorph 156 inside a hypodermic needle tubing 157 having a window 158. By applying suitable voltages to the bimorph, the microscope 155 can be deflected to focus at various sample planes 159. The hypodermic tubing is shown mounted to a cable 161 which houses the optical fiber, the leads for driving the scan mirror electrodes, and receiving signals from the detector 64 from the scanning head. The micromachined confocal microscope can also be mounted for use in dentistry, dermatology, etc.

Although a specific embodiment of the invention has been provided, modifications can be made without departing from the invention. For example, the mirrors may be cantilevered or supported on a single post. There has been provided a miniature scanning confocal microscope making use of micro-machined scanning mirrors and parts.

The foregoing description of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

1. L. Giniunas, R. Juskaitis & S. J. Shatalin, "Scanning fiber optic microscope," *Elect. Lett.* 27, 724–726 (1991).
2. T. Dabbs & M. Glass, "Fiber-optic confocal microscope—FOCON," *Appl. Opt* 31, 3030–3035 (1993).
3. L. Giniunas, R. Juskaitis & S. J. Shatalin, "Endoscope with optical sectioning capability," *Appl. Opt.* 32, 2888–2890 (1993).
4. R. Juskaitis & T. Wilson, "Direct-view fiber-optic confocal microscope," *Opt. Lett.* 19, 1906–1908 (1994).
5. P. M. Delaney, M. R. Harris & R. G. King, "Fiber optic laser scanning confocal microscope suitable for fluorescence imaging," *Appl. Opt.* 33, 573–577 (1994).
6. A. F. Gmitro & D. Azis, "Confocal microscope through a fiber-optic imaging bundle," *Opt. Lett.* 18, 565–567 (1993).
7. D. Dickensheets & G. S. Kino "A Scanned Optical Fiber Confocal Microscope," *Proc. SPIE,* 2184, 39–47 (1994).
8. K. E. Petersen, "Silicon Torsional Scanning Mirror," *IBM J. Res. Dev.,* 24, 631–637 (1980).
9. M. G. Allen, M. Scheidel & R. L. Smith, "Movable Micromachined Silicon Plates with Integrated Position Sensing," *Sensors and Actuators,* A21–A23, 211–214 (1990).
10. V.P. Jaecklin, C. Linder, N. F. deRooij, J. M. Moret, R. Vuilleumier, "Line-addressable torsional micromirrors for light modulator arrays," *Sensors and Actuators,* A41–42, 324–329 (1990).
11. M. Fischer, H. Graef, W. von Munch, "Electrostatically deflectable polysilicon torsional mirrors," *Sensors and Actuators,* A44, 83–89 (1994).
12. K. E. Mattsson, "Surface micromachined scanning mirrors," *Microelectronic Engineering* 19, 199–204 (1992).
13. L. J. Hornbeck, "Spatial light modulator and method," U.S. Pat. No. 5,061,049, Oct. 29, 1991.
14. L. J. Hornbeck, "Spatial light modulator," U.S. Pat. No. 4,956,619, Sep. 11, 1990.
15. N. Asada, H. Matsuki, K. Minami, M. Esashi, "Silicon micromachined two-dimensional galvano optical scanner," *IEEE Transactions on Magnetics* 30 (1994) 4647–9.
16. M. J. Daneman, O. Solgaard, N. C. Tien, K. Y. Lau, R. S. Muller, "Laser-to-fiber coupling module using a micromachined alignment mirror," *IEEE Photonics Technology Letters* 8 (1996) 396–8.
17. R. A. Buser, N. F. de Rooij, H. Tischhhauser, A. Dommann, G. Staufert, "Biaxial scanning mirror activated by bimorph structures for medical applications," *Sensors and Actuators* A 31 (1992) 29–34.
18. D. L. Dickensheets, G. S. Kino, "Micromachined scanning confocal optical microscope," *Opt. Lett.* 21, (1996) 764–6.
19. D. L. Dickensheets, G. S. Kino, "A micromachined confocal optical microscope," *Proc. Soc. Photo. Opt. Instrum. Eng.* 2655, (1996) 79–85.
20. Charles Kittel and Herbert Kroemer, *Thermal Physics*, (W. H. Freeman, San Francisco, 1980) ch. 13.
21. W. P. Maszara, G. Goetz, A. Caviglia, J. B. McKitterick, "Bonding of silicon wafers for silicon-on-insulator," *J. Appl. Phys.* 64 (1988) 4943–4950.
22. B. R. Hopkins, *Design Analysis of Shafts and Beans*, 2nd Ed. (R. E. Krieger Pub. Co., Malabar, Fla., 1987), p. 365.

What is claimed:

1. A microscanning apparatus, comprising:

a semiconductor substrate;

a pivot plate coupled to the semiconductor substrate and pivotable about an axis relative to the substrate, the pivot plate including:
an external face having a first terminal coupled thereto;
an internal face positioned between the external face and the substrate;
a depletion region between the external and internal faces formed during an application of voltage wherein said application of voltage between said first terminal and said substrate causes the plate to pivot; and
a reflective surface that is pivotable in response to pivoting of the pivot plate.

2. A microscanning apparatus as in claim 1 in which the external face of said plate includes a terminal on each side of said semiconductive pivot axis and depletion regions are associated with each terminal whereby drive voltages selectively applied between said terminals and the substrate cause the plate to pivot.

3. A microscanning apparatus as in claim 1 or 2 in which the plate is semiconductive material and a p-n junction is formed between said respective terminal and the semiconductive material whereby the semiconductive material is depleted of carriers by application of the drive voltage to the respective terminal.

4. A microscanning apparatus as in claim 3 in which the semiconductive material is silicon.

5. A microscanning apparatus as in claim 1 or 2 in which the plate is formed in a wafer of semiconductive material by micromachining to define said plate and semiconductive hinges on said pivot axis.

6. A microscanning apparatus as in claim 5 in which the semiconductive hinges are silicon nitride.

7. A microscanning apparatus as in claims 1 or 2 in which said reflective surface forms said first terminal.

8. A microscanning apparatus as in claim 5 wherein said substrate includes a well and said wafer is carried by the surface of said substrate with the plate disposed above the well whereby the plate can pivot about its pivot axis.

9. A mirror for a microscanning device, comprising:

a plate of a semiconductive material pivotably coupling to a supporting structure, the plate including a reflective surface positioned for exposure when the plate is coupled to the supporting structure;

a semiconductor junction formed in the plate; and wherein said plate is formed in a wafer of semiconductor material of one conductivity type by micromachining and a region of opposite conductivity type is formed in said plate to form said semiconductor junction and hinges pivotably support said plate on said wafer.

10. A mirror as in claim 9 in which spaced semiconductor junctions are formed in said plate and terminals are connected to said regions of opposite conductivity type for selectively depleting the plate semiconductive material associated with each junction.

11. A mirror as in claim 9 or 10 in which the support structure is semiconductive material.

12. A mirror as in claim 10 in which drive voltages are selectively applied between said terminals and said support structure to pivot the mirror.

13. An electrically actuated scanner as in claim 12 in which said plate of semiconductive material is of one conductivity type and a region of opposite conductivity type electrically connects each of the spaced electrodes to the plate of semiconductive material.

14. An electrically actuated scanner as in claim 11 or 12 in which said hinge is silicon nitride.

15. A electrically actuated scanner, comprising:

a substrate;

a mirror body having a first semiconductor region having a first set of electrical properties, a second semiconductor region having a second set of electrical properties different from first set, and a barrier region disposed between the first and second regions, the barrier region forming a barrier to limit electron flow between the first and second regions;

a hinge coupled between the substrate and the mirror body and configured to pivotably couple the mirror plate to the substrate; and first and second terminals coupled to the first semiconductor region and to the substrate respectively.

16. An electrically actuated scanner as in claim 15 in which the mirror body and the binge coupled between the substrate and mirror body are formed by micromachining a semiconductive material.

17. An electrically actuated scanner as in claim 15 including spaced second conductor regions.

18. An electrically actuated scanner as in claim 16 or 17 in which said hinge is silicon nitride.

19. A micromechanical device comprising:

a base;

a movable assembly linked to the base, the movable assembly including a first member having an integral first region of a first material and an integral second region of a second material, wherein the first region has a first composition including a first semiconductor material and the second region has a second composition different from the first composition, the first and second compositions having different electrical properties, the movable assembly being responsive to periodic electrostatic forces to move in a predetermined periodic pattern relative to the base; and a first section in the base having a terminal for electrical control, the first section being aligned with the movable assembly and positioned to produce an electric field extending from the first section to the first or second regions.

20. The device of claim 19 wherein the first region includes second regions of semiconductor material.

21. The device of claim 20 wherein the second semiconductor material is doped differently from the first semiconductor material.

22. The device of claim 19 wherein the movable member is torsionally coupled to the base.

23. The device of claims 19, 20, 21, or 22 in which the first region of a first material supports a mirror.

* * * * *